United States Patent
Tang

(10) Patent No.: US 11,234,263 B2
(45) Date of Patent: Jan. 25, 2022

(54) DATA SCHEDULING METHOD AND RELATED DEVICE

(71) Applicant: SHENZHEN HEYTAP TECHNOLOGY CORP., LTD., Guangdong (CN)

(72) Inventor: Hai Tang, Dongguan (CN)

(73) Assignee: SHENZHEN HEYTAP TECHNOLOGY CORP., LTD., Guangdong (CN)

(*) Notice: Subject to any disclaimer, the term of this patent is extended or adjusted under 35 U.S.C. 154(b) by 66 days.

(21) Appl. No.: 16/624,237

(22) PCT Filed: Aug. 4, 2017

(86) PCT No.: PCT/CN2017/095964
§ 371 (c)(1),
(2) Date: Dec. 18, 2019

(87) PCT Pub. No.: WO2019/024076
PCT Pub. Date: Feb. 7, 2019

(65) Prior Publication Data
US 2020/0137790 A1    Apr. 30, 2020

(51) Int. Cl.
*H04W 72/14* (2009.01)
*H04W 76/27* (2018.01)
(Continued)

(52) U.S. Cl.
CPC ........... *H04W 72/14* (2013.01); *H04L 5/0053* (2013.01); *H04W 72/1263* (2013.01); *H04W 76/27* (2018.02)

(58) Field of Classification Search
CPC . H04W 72/14; H04W 76/27; H04W 72/1263; H04L 5/0053
(Continued)

(56) References Cited

U.S. PATENT DOCUMENTS

2012/0057560 A1* 3/2012 Park ................. H04L 1/189
370/329
2015/0271807 A1 9/2015 Patil et al.
(Continued)

FOREIGN PATENT DOCUMENTS

CN    105517168 A    4/2016
CN    106105367 A    11/2016
(Continued)

OTHER PUBLICATIONS

First Office Action of the Russian application No. 2019145220, dated Jan. 15, 2021.
(Continued)

*Primary Examiner* — Obaidul Huq
(74) *Attorney, Agent, or Firm* — Ladas & Parry, LLP

(57) ABSTRACT

The present disclosure provides a data scheduling method and a related device. The method includes that: a user equipment (UE) receives control information from a network device; the UE determines a version of duplicated data to be transmitted on a granted resource according to the control information; and the UE transmits data corresponding to the version on the granted resource. With adoption of the embodiments of the present disclosure, a version of data for which the UE may use a granted resource provided by a network may be determined.

15 Claims, 6 Drawing Sheets

(51) Int. Cl.
*H04L 5/00* (2006.01)
*H04W 72/12* (2009.01)

(58) Field of Classification Search
USPC .......................................... 370/310, 328, 329
See application file for complete search history.

(56) References Cited

U.S. PATENT DOCUMENTS

| | | | |
|---|---|---|---|
| 2016/0338095 A1 | 11/2016 | Faurie et al. | |
| 2016/0338096 A1* | 11/2016 | Vajapeyam | H04W 74/04 |
| 2017/0164187 A1* | 6/2017 | Lu | H04W 8/24 |
| 2017/0245313 A1 | 8/2017 | Kim et al. | |
| 2019/0082459 A1 | 3/2019 | Faurie et al. | |

FOREIGN PATENT DOCUMENTS

| | | |
|---|---|---|
| CN | 106412794 A | 2/2017 |
| EP | 3133843 A1 | 2/2017 |
| RU | 2580668 C1 | 4/2016 |
| WO | 2015142425 A1 | 9/2015 |
| WO | 2016021227 A1 | 2/2016 |
| WO | 2016028059 A1 | 2/2016 |
| WO | 2017101207 A1 | 6/2017 |

OTHER PUBLICATIONS

First Office Action of the European application No. 17920124.9, dated Jan. 19, 2021.
First Office Action of the Canadian application No. 3066646, dated Feb. 12, 2021.
First Office Action of the Chilean application No. 201903658, dated Mar. 17, 2021.
Second Office Action of the Chinese application No. 201780091214.6, dated Sep. 2, 2020.
Notice of Rejection of the Chinese application No. 201780091214.6, dated Nov. 3, 2020.
Supplementary European Search Report in the European application No. 17920124.9, dated Apr. 20, 2020.
First Office Action of the Chinese application No. 201780091214.6, dated Jul. 1, 2020, with search report.
CATT: "Impact of PDCP duplication on MAC", 3GPP Draft; R2-1706372, 3rd Generation Partnership Project (3GPP), Mobile Competence Centre; 650, Route Des Lucioles; F-06921 Sophia-Antipolis Cedex; France vol. RAN WG2, No. Qingdao, China; Jun. 27, 2017-Jun. 29, 2017 Jun. 17, 2017 (Jun. 17, 2017), XP051306976, Retrieved from the Internet: URL: http://www.3gpp. org/ftp/tsg-ran/WG2 RL 2/TSGR2 AHs/2017 06 NR/Docs/[retrieved on 2017-66-17] * paragraph [0001] *.
ZTE: "Consideration on the LCP for data duplication", 3GPP Draft; R2-1704666 Consideration On the LCP for Data Duplication, 3rd Generation Partnership Project (3GPP) Mobile Competence Centre; 650, Route Deslucioles; F-06921 Sophia-Antipolis Cedex F vol. RAN WG2, No. Hangzhou, China;May 15, 2017-May 19, 2017 May 14, 2017 (May 14, 2017), XP051275211, Retrieved from the Internet: URL: http://www.3gpp.org/ftp/Meetings 3GPP SYNC/RAN2/Docs/ [retrieved on May 14, 2017] * paragraph [0002] *.
English translation of the Written Opinion of the International Search Authority in the international application No. PCT/CN2017/095964, dated May 4, 2018.
International Search Report in the international application No. PCT/CN2017/095964, dated May 4, 2018.
Written Opinion of the International Search Authority in the international application No. PCT/CN2017/095964, dated May 4, 2018.
Second Office Action of the European application No. 17920124.9, dated Apr. 22, 2021.
Office Action of the Indian application No. 202017001125, dated May 19, 2021.
Second Office Action of the Canadian application No. 3066646, dated Jul. 6, 2021.
Second Office Action of the Chilean application No. 201903658, dated Aug. 13, 2021.
Written Opinion of the Singaporean application No. 11201912083V, dated Aug. 16, 2021.

* cited by examiner

DATA SCHEDULING METHOD AND RELATED DEVICE

CROSS-REFERENCE TO RELATED APPLICATIONS

The application is a national phase application of International Patent Application No. PCT/CN2017/095964, filed on Aug. 4, 2017, the content of which is hereby incorporated by reference in its entireties.

TECHNICAL FIELD

The present disclosure relates to the technical field of communications, and more particularly to a data scheduling method and a related device.

BACKGROUND

Internet of vehicles system is a Sidelink (SL) transmission technology based on Long Term Evolution (LTE)-Device to Device (D2D). Unlike a conventional LTE system adopting a manner of receiving or sending communication data through a base station, an Internet of vehicles system adopts a manner of direct communication from User Equipment (UE) to UE, and thus is higher in spectrum efficiency and lower in transmission delay.

Carrier Aggregation (CA) supports data duplication. Data duplication means transmitting a duplicated Protocol Data Unit (PDU) to two Radio Link Control (RLC) entities by use of a data duplication function at a Packet Data Convergence Protocol (PDCP) layer or a Media Access Control (MAC) layer, to ensure that the duplicated PDU can be transmitted on different physical aggregated carriers, thereby achieving a frequency diversity gain to improve data transmission reliability.

When a mode of performing resource scheduling by a network is adopted, in a data duplication mode, duplicated data transmitted between UE is needed to be multiplexed onto different carriers.

SUMMARY

Embodiments of the present disclosure provide a data scheduling method and a related device, which can be used to indicate which version of data the granted resource provided by a network will be used by a UE to serve.

According to a first aspect, the embodiments of the present disclosure provide a data scheduling method, which may include the following operations.

A UE receives control information from a network device.

The UE determines a version of duplicated data to be transmitted by a granted resource according to the control information.

The UE transmits data corresponding to the version on the granted resource.

According to a second aspect, the embodiments of the present disclosure provide a data scheduling method, which may include the following operations.

A network device configures control information. The control information is used to determine a version of duplicated data to be transmitted by a granted resource.

The network device sends the control information.

According to a third aspect, the embodiments of the present disclosure provide a UE, which may include a communication unit and a processing unit.

The processing unit may be configured to receive, through the communication unit, control information from a network device, determine a version of duplicated data to be transmitted on a granted resource according to the control information, and transmit, through the communication unit, data corresponding to the version on the granted resource.

According to a fourth aspect, the embodiments of the present disclosure provide a network device, which may include a communication unit and a processing unit.

The processing unit may be configured to configure control information. The control information is used to determine a version of duplicated data to be transmitted on a granted resource, and send, through the communication unit, the control information.

According to a fifth aspect, the embodiments of the disclosure provide a UE, which may include one or more processors, one or more memories, one or more transceivers and one or more programs. The one or more programs are stored in the memory and configured to be executed by the one or more processors, and the programs include instructions for executing the steps in the method according to the first aspect.

According to a sixth aspect, the embodiments of the disclosure provide a network device, which may include one or more processors, one or more memories, one or more transceivers and one or more programs. The one or more programs are stored in the memory and configured to be executed by the one or more processors, and the programs include instructions for executing the steps in the method according to the second aspect.

According to a seventh aspect, the embodiments of the disclosure provide a computer-readable storage medium, which may store a computer program for electronic data exchange, the computer program enabling a computer to execute the method according to the first aspect.

According to an eighth aspect, the embodiments of the disclosure provide a computer-readable storage medium, which may store a computer program for electronic data exchange, the computer program enabling a computer to execute the method according to the second aspect.

According to a ninth aspect, the embodiments of the disclosure provide a computer program product, which may include a non-transitory computer-readable storage medium including a computer program, the computer program being operated to enable a computer to execute the method according to the first aspect.

According to a tenth aspect, the embodiments of the disclosure provide a computer program product, which may include a non-transitory computer-readable storage medium including a computer program, the computer program being operated to enable a computer to execute the method according to the second aspect.

These aspects or other aspects of the present disclosure will become clearer and easier to understand through the following descriptions about the embodiments.

BRIEF DESCRIPTION OF DRAWINGS

In order to describe the technical solutions in the embodiments of the present disclosure or a conventional art more clearly, the drawings required to be used in descriptions about the embodiments or the conventional art will be simply introduced below. It is apparent that the drawings described below are only some embodiments of the present disclosure. Other drawings may further be obtained by those of ordinary skill in the art according to these drawings without creative work.

DETAILED DESCRIPTION

In order to make the solutions of the present disclosure understood by those skilled in the art, the technical solutions in the embodiments of the present disclosure will be clearly and completely described below in combination with the drawings in the embodiments of the present disclosure. It is apparent that the described embodiments are not all embodiments but only part of embodiments of the present disclosure. All other embodiments obtained by those of ordinary skill in the art based on the embodiments in the present disclosure without creative work shall fall within the scope of protection of the present disclosure.

Detailed descriptions will be made below respectively.

Terms "first", "second", "third", "fourth" and the like in the specification, claims and drawings of the present disclosure are adopted not to describe a specific sequence but to distinguish different objects. In addition, terms "include" and "have" and any transformations thereof are intended to cover nonexclusive inclusions. For example, a process, method, system, product or device including a series of steps or units is not limited to the steps or units which have been listed but optionally further includes steps or units which are not listed or optionally further includes other steps or units intrinsic to the process, the method, the product or the device.

"Embodiment" mentioned in the disclosure means that a specific feature, structure or characteristic described in combination with an embodiment may be included in at least one embodiment of the present disclosure. Each position where this phrase appears in the specification does not always refer to the same embodiment as well as an independent or alternative embodiment mutually exclusive to another embodiment. It is explicitly and implicitly understood by those skilled in the art that the embodiments described in the disclosure may be combined with other embodiments.

The embodiments of the present disclosure will be described below in combination with the drawings.

Figure 1:
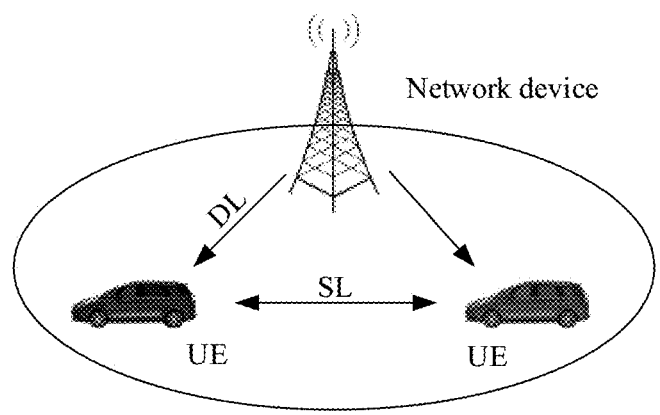
FIG. 1 illustrates a schematic diagram of a network architecture in a mode 3 according to an embodiment of the present disclosure.
Figure 2:
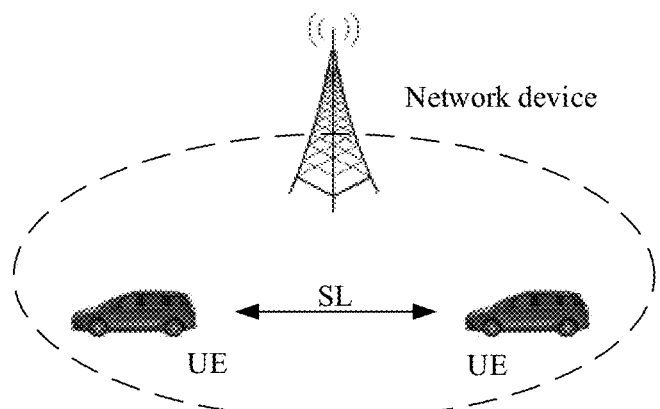
FIG. 2 illustrates a schematic diagram of a network architecture in a mode 4 according to an embodiment of the present disclosure.

In 3rd Generation Partnership Project (3GPP) Release 14 (Rel-14), Vehicle to Vehicle (V2V) is standardized, and two transmission modes are defined: a mode 3 and a mode 4. A network architecture in the mode 3 is illustrated in FIG. 1. In the mode 3, a transmission resource of a UE (for example, a vehicular terminal) is allocated by a network device, and the UE sends data on an SL according to the resource allocated by the network device; and the network device may allocate a resource for single transmission for the UE, or may allocate a resource for semi-persistent transmission for the UE. A network architecture in the mode 4 is illustrated in FIG. 2. In the mode 4, a UE (for example, a vehicular terminal) adopts a transmission manner of sensing plus reservation. The UE acquires an available transmission resource set in a resource pool in a sensing manner, and the UE randomly selects a resource from the set for data transmission. Since services in an Internet of vehicles system have a characteristic of periodicity, the UE usually adopts a semi-persistent transmission manner, namely the UE, after selecting a transmission resource, may keep using the resource in multiple transmission cycles, so that the probabilities of resource reselection and resource conflict are reduced. The UE includes information of reserving a resource for next transmission in control information transmitted this time such that other UE can detect the control information of the UE, and determine whether the resource is reserved and used by the UE, thus achieving the purpose of reducing resource conflicts.

When a mode of performing resource scheduling by a network is adopted, in a data duplication mode, duplicated data transmitted between the UEs is needed to be multiplexed onto different carriers. Thus it can be seen that when a network device provides a granted resource, the network device needs to indicate the version of data for which the granted resource is to be used by the UE; and when the UE receives the granted resource, the UE determines the version of data for which the network device expects the granted resource to use.

For solving the problem, in the solution, the network device firstly configures a piece of control information, the control information is defined to determine a version of duplicated data to be transmitted on the granted resource, and then the network device sends the control information; and when the UE receives the control information, the UE may determine the version of data for which the network device expects the UE to use the granted resource.

The UE is a device for providing voice and/or data connectivity for a user, for example, a handheld device, vehicular device and the like with a wireless connection function. Common UEs include, for example, a mobile phone, a tablet computer, a notebook computer, a palm computer, a Mobile Internet Device (MID) and a wearable device such as a smart watch, a smart band and a pedometer.

The network device is a node device at the network side. For example, the network device may be a Radio Access Network (RAN) device at an access network side in a cellular network, and the RAN device is a device implementing access of a UE to a wireless network, including, but not limited to, an Evolved Node B (eNB), a Radio Network Controller (RNC), a Node B (NB), a Base Station Controller (BSC), a Base Transceiver Station (BTS), a home base station (for example, a home eNB or a Home Node B (HNB)), a BaseBand Unit (BBU) and a Mobility Management Entity (MME). For another example, the network device may also be a node device in a Wireless Local Area Network (WLAN), for example, an Access Controller (AC), a gateway or a Wireless Fidelity (WiFi) Access Point (AP).

Data scheduling methods provided in the embodiments of the present disclosure will be described below in combination with the network architecture illustrated in FIG. 1 and FIG. 2 in detail.

Figure 3:
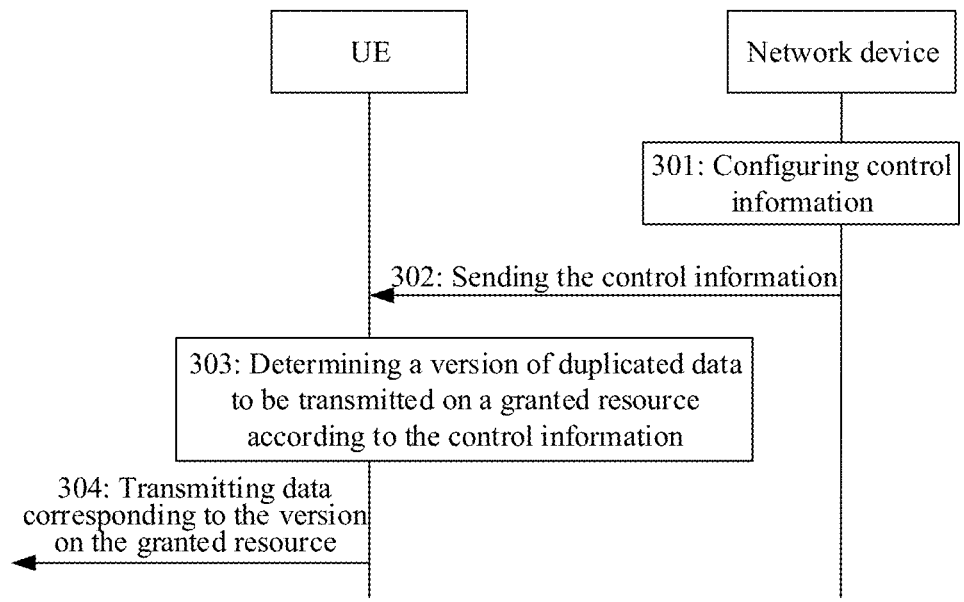
FIG. 3 illustrates a flowchart of a data scheduling method according to an embodiment of the present disclosure.
Figure 4:
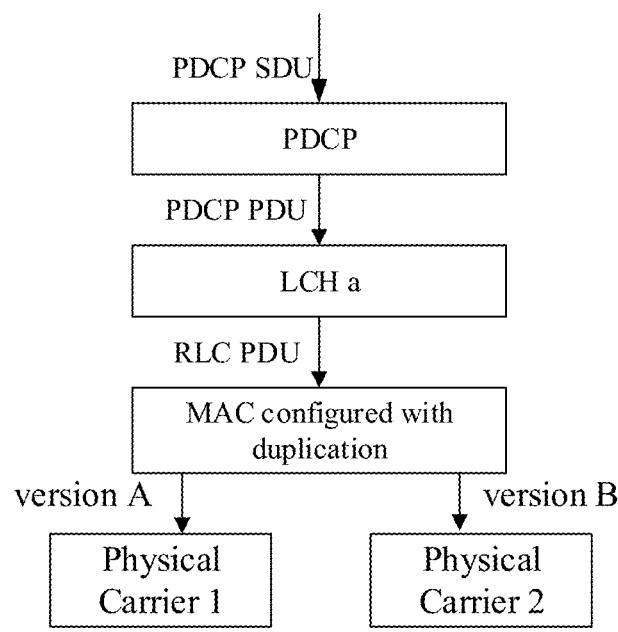
FIG. 4 illustrates a diagram of a structure of a protocol according to an embodiment of the present disclosure.

FIG. 3 is a flowchart of a data scheduling method according to an embodiment of the present disclosure. The data scheduling method is applied for duplication at a MAC layer. For example, as illustrated in FIG. 4, a MAC PDU is duplicated into MAC PDU version A and MAC PDU version B at the MAC layer, MAC PDU version A is transmitted on a physical carrier 1, and MAC PDU version B is transmitted on a physical carrier 2, the physical carrier 1 is different from the physical carrier 2. If a Hybrid Automatic Repeat-reQuest (HARQ) entity corresponds to a physical carrier, the method includes the following steps.

In 301, a network device configures control information. The control information is used to determine a version of duplicated data to be transmitted on a granted resource.

The control information may be sidelink control information (SCI) or other link control information, which will not be limited herein.

In an example, the control information includes at least one of: time-frequency position information of the granted resource, indication information, a UE Identity (ID), a HARQ process ID, a new data indication and the like.

The indication information is used to indicate the version of the duplicated data to be transmitted on the granted resource.

Furthermore, when the control information is SCI, the indication information is information of a first bit newly added in the SCI.

For example, when the network device configures the SCI, 1-bit information (i.e., information of the first bit) is newly added in the SCI, the newly added 1-bit information is used to indicate the version of the duplicated data to be transmitted on the granted resource. For example, a MAC PDU is duplicated into MAC PDU version A and MAC PDU version B in a MAC layer, if the network device expects the granted resource to be used for transmission of data of version A, the network device sets a value of the newly added 1-bit information to be "0", and if the network device expects the granted resource to be used for transmission of data of version B, the network device sets the value of the newly added 1-bit information to be "1".

Furthermore, when the control information is SCI, the indication information is defined by use of a reserved 1 bit in the SCI.

For example, when the network device configures the SCI, a new piece of information (i.e., the indication information) is defined by use of the reserved 1 bit in the SCI, the newly defined information is used to indicate the version of the duplicated data to be transmitted on the granted resource. For example, a MAC PDU is duplicated into MAC PDU version A and MAC PDU version B in the MAC layer, if the network device expects the granted resource to be used for transmission of data of version A, the network device sets a value of the newly defined information bit to be "0", and if the network device expects the granted resource to be used for transmission of data of version B, the network device sets the value of the newly defined information bit to be "1".

The UE ID is used to indicate a target UE of the granted resource.

Furthermore, when the control information is SCI, the UE ID is second bit information newly added in the SCI.

For example, when the network device configures the SCI, a piece of multi-bit (for example, 32-bit) information (i.e., the second bit information) is newly added in the SCI, the newly added multi-bit information is used to indicate the target UE of the granted resource. For example, there are three D2D UEs at present, the three UEs are, for example, UE A, UE B and UE C; the network device sends a granted resource to the UE A, and if the network device expects the target UE of the granted resource to be the UE B, the network device sets the newly added multi-bit information to be an ID of the UE B.

Furthermore, when the control information is SCI, the UE ID is defined using multiple reserved bits in the SCI.

For example, when the network device configures the SCI, a new piece of information (i.e., the UE ID) is defined by use of multiple reserved bits in the SCI, the newly defined information is used to indicate the target UE of the granted resource. For example, there are three pieces of D2D UE at present, the three pieces of UE being, for example, UE A, UE B and UE C, the network device sends a granted resource to the UE A, and if the network device expects target UE of the granted resource to be the UE B, the network device sets the newly defined information to be an ID of the UE B.

A UE ID may represent an ID of a UE, or may represent an ID of a group of UE, which will not be limited herein.

In 302, the network device sends the control information.

The operation that the network device sends the control information to a UE may include direct sending to the UE by the network device and may include sending to the UE through another network device, which will not be limited herein.

In 303, the UE determines the version of the duplicated data to be transmitted on the granted resource according to the control information.

In an example, the control information includes the indication information, the indication information indicates the version of the duplicated data to be transmitted on the granted resource, and a specific implementation mode for the operation that the UE determines the version of the duplicated data to be transmitted on the granted resource according to the control information is as follows.

The UE determines the version of the duplicated data to be transmitted by the granted resource according to the indication information.

For example, there is made such a hypothesis that a MAC PDU is duplicated into MAC PDU version A and MAC PDU version B in the MAC layer, the control information is SCI, the indication information is 1-bit information newly added in the SCI, when a value of the newly added 1 bit information is set to be "0", it is indicated that the granted resource is used to transmit data of version A, and when the value of the newly added 1-bit information is set to be "1", it is indicated that the granted resource is used to transmit data of version B. If the UE analyzes the SCI from the network device to obtain that the value of the 1-bit information newly added in the SCI is 0, the UE determines that the network device expects the UE to transmit data of version A on the granted resource.

In an example, the method further includes the following operations.

The network device sends signaling. The signaling contains a mapping relationship between carriers and versions of the duplicated data, and the mapping relationship between carriers and versions of the duplicated data is used to determine the version of the duplicated data to be transmitted on the granted resource.

The UE receives the signaling from the network device.

A specific implementation mode for the operation that the UE determines the version of the duplicated data to be transmitted on the granted resource according to the control information is as follows.

The UE determines the version of the duplicated data to be transmitted on the granted resource according to the mapping relationship between carriers and versions of the duplicated data.

Specifically, the network device defines the mapping relationship between carriers and versions of the duplicated data in advance, then the network device sends the mapping relationship to the UE through the signaling, the network device subsequently sends the granted resource to the UE, the UE determines carrier corresponding to the granted resource according to a time-frequency position of the granted resource, and the UE finally determines the version of the data that the network device expects the UE to transmit on the granted resource according to the mapping relationship. If an MAC PDU is duplicated into MAC PDU version A and MAC PDU version B in the MAC layer, the mapping relationship between carriers and versions of the duplicated data may be illustrated in Table 1, for example. For example, if the mapping relationship between carriers and versions of the duplicated data is illustrated in Table 1, and the granted resource sent to the UE by the network device corresponds to a carrier 2, the UE may determine according to Table 1 that the network device expects the UE to transmit data of version A on the granted resource.

TABLE 1

| Carrier | Data version |
| --- | --- |
| Carriers 1~3 | Version A |
| Carriers 4~6 | Version B |

Furthermore, the signaling includes Radio Resource Control (RRC) signaling or system information.

Specifically, since both the RRC signaling or the system information are required when the network device and the UE establish a connection, the network device may configure the mapping relationship between carriers and versions of the duplicated data through the RRC signaling or the system information, to reduce a signaling overhead.

In 304, the UE receives the control information from the network device, and the UE transmits data corresponding to the version on the granted resource.

In an example, the control information includes the UE ID, the UE ID is used to indicate the target UE of the granted resource, and a specific implementation mode for the operation that the UE transmits the data corresponding to the version on the granted resource is as follows.

The UE transmits the data, corresponding to the version, for the UE ID on the granted resource.

For example, if there are three D2D UEs, the three UEs are, for example, UE A, UE B and UE C, the network device sends the control information to the UE A, after the UE A receives the control information, the UE A analyzes the control information to obtain that the UE ID is an ID of UE B, then the UE A knows that the target UE of the granted resource is the UE B, and then transmits data of the UE B on the granted resource.

Thus it can be seen that, in the solution, the network device firstly configures a piece of control information, the control information being defined to determine the version of the duplicated data to be transmitted on the granted resource, and then the network device sends the control information; and when the UE receives the control information, the UE may determine the version of the data for which the network device expects the UE to use the granted resource.

Figure 5:
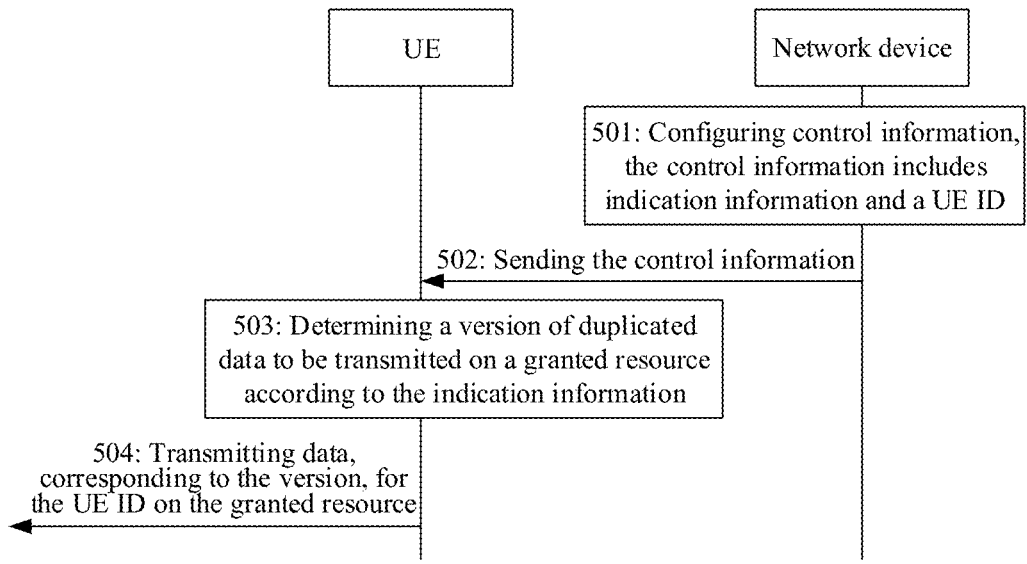
FIG. 5 illustrates a flowchart of another data scheduling method according to an embodiment of the present disclosure.

FIG. 5 illustrates another data scheduling method according to an embodiment of the disclosure. The method includes the following steps.

In 501, a network device configures control information, the control information indicates a granted resource, the control information includes indication information and a UE ID, the indication information is used to indicate a version of duplicated data to be transmitted on the granted resource, and the UE ID indicates a target UE of the granted resource.

In 502, the network device sends the control information.

In 503, UE receives the control information from the network device, and the UE determines the version of the duplicated data to be transmitted on the granted resource according to the indication information.

In 504, the UE transmits data, corresponding to the version, for the UE ID on the granted resource.

It is to be noted that specific implementation modes of each step of the method illustrated in FIG. 5 may be seen from the abovementioned method and will not be described herein.

Figure 6:
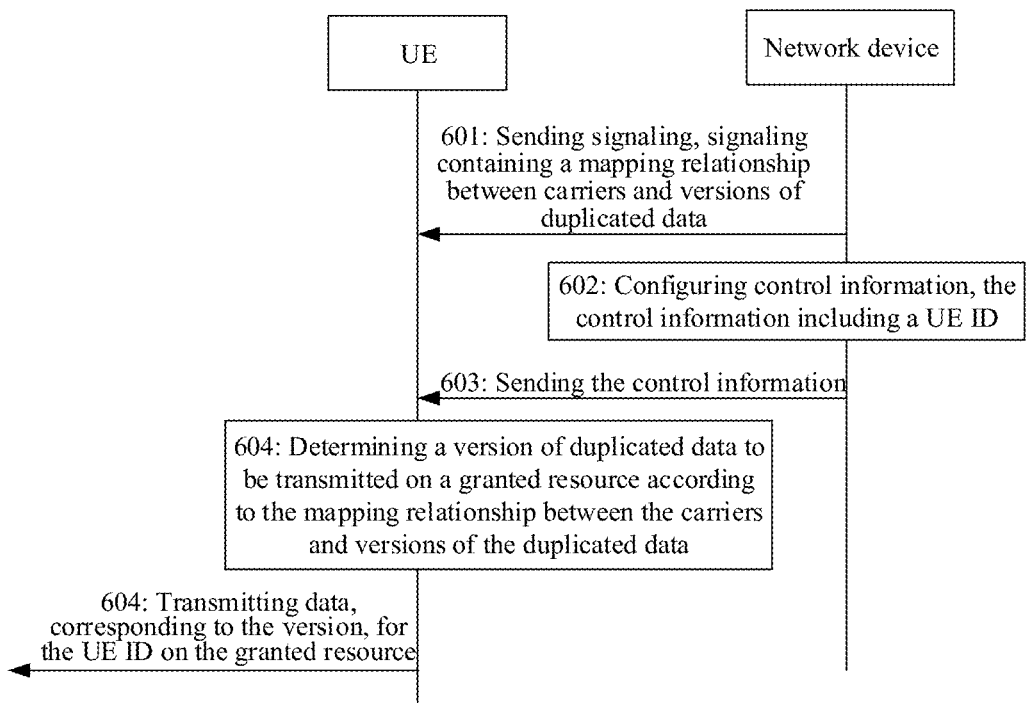
FIG. 6 illustrates a flowchart of another data scheduling method according to an embodiment of the present disclosure.

FIG. 6 illustrates another data scheduling method according to an embodiment of the disclosure. The method includes the following steps.

In 601, a network device sends signaling, and a UE receives the signaling, the signaling contains a mapping relationship between carriers and versions of the duplicated data, and the signaling includes RRC signaling or system information.

In 602, the network device configures control information, the control information indicates a granted resource, the control information includes a UE ID, and the UE ID is used to indicate a target UE of the granted resource.

In 603, the network device sends the control information.

In 604, the UE receives the control information, and the UE determines a version of duplicated data to be transmitted on the granted resource according to the mapping relationship between carriers and versions of the duplicated data.

In 605, the UE transmits data, corresponding to the version, for the UE ID on the granted resource.

It is to be noted that specific implementation modes of each step of the method illustrated in FIG. 6 may be seen from the abovementioned method and will not be described herein.

Figure 7:
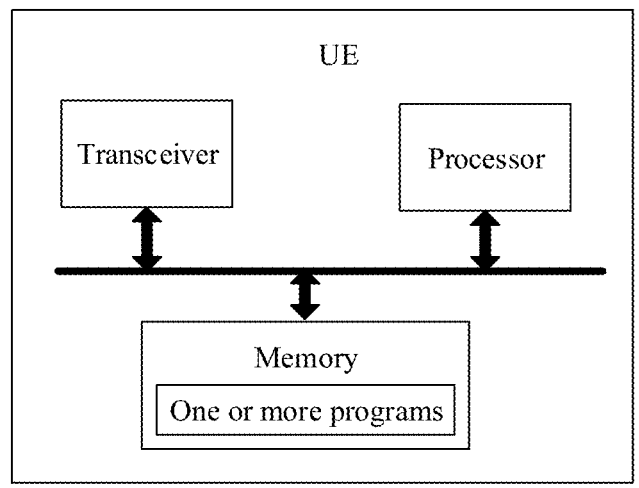
FIG. 7 illustrates a block diagram of a UE according to an embodiment of the present disclosure.

Consistent with the embodiment illustrated in FIG. 3, as illustrated in FIG. 7, FIG. 7 is a block diagram of UE according to an embodiment of the disclosure. As illustrated in the figure, the UE includes one or more processors, one or more memories, one or more transceivers, and one or more programs. The one or more programs are stored in the memories and configured to be executed by the one or more processors. The programs include instructions configured to execute the following steps.

Control information is received from a network device.

A version of duplicated data to be transmitted on a granted resource is determined according to the control information.

Data corresponding to the version is transmitted on the granted resource.

In an example, the control information includes indication information, the indication information is used to indicate the version of the duplicated data to be transmitted on the granted resource, and in terms of determining the version of the duplicated data to be transmitted on the granted resource according to the control information, the programs include instructions for executing the following step.

The version of the duplicated data to be transmitted on the granted resource is determined according to the indication information.

In an example, the programs include instructions for further executing the following step.

Signaling is received from the network device. The signaling contains a mapping relationship between carriers and versions of the duplicated data.

In terms of determining the version of the duplicated data to be transmitted on the granted resource according to the control information, the programs include instructions for executing the following step.

The version of the duplicated data to be transmitted on the granted resource is determined according to the mapping relationship between carriers and versions of the duplicated data.

In an example, the signaling includes RRC signaling or system information.

In an example, the control information includes a UE ID, the UE ID indicates a target UE of the granted resource, and in terms of transmitting the data corresponding to the version on the granted resource, the programs include instructions for executing the following step.

The data, corresponding to the version, of the UE ID is transmitted on the granted resource.

In an example, the control information is CSI, the indication information is first bit information newly added in the SCI, and the UE ID is second bit information newly added in the SCI.

Figure 8:
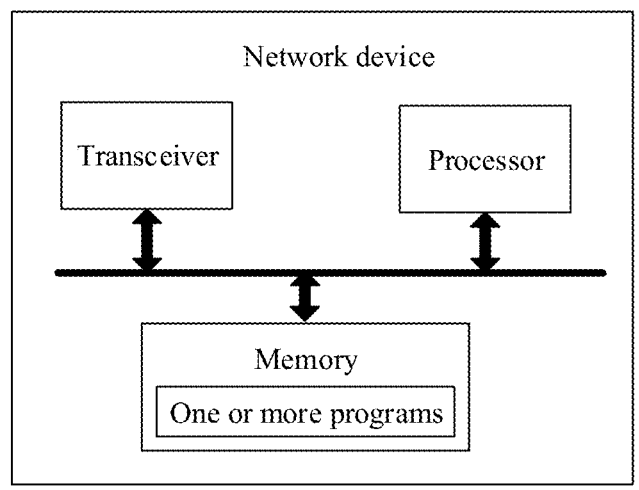
FIG. 8 illustrates a block diagram of a network device according to an embodiment of the present disclosure.

Consistent with the embodiment illustrated in FIG. 3, referring to FIG. 8, FIG. 8 is a block diagram of a network device according to an embodiment of the disclosure. As illustrated in the figure, the network device includes one or more processors, one or more memories, one or more transceivers and one or more programs. The one or more programs are stored in the memories and configured to be executed by the one or more processors. The programs include instructions for executing the following steps.

Control information is configured, the control information is used to determine a version of duplicated data to be transmitted on a granted resource.

The control information is sent.

In an example, the control information includes indication information, and the indication information indicates the version of the duplicated data to be transmitted on the granted resource.

In an example, the programs include instructions for further executing the following step:

Signaling is sent. The signaling contains a mapping relationship between carriers and versions of the duplicated data, and the mapping relationship between carriers and versions of the duplicated data is used to determine the version of the duplicated data to be transmitted on the granted resource.

In an example, the signaling includes RRC signaling or system information.

In an example, the control information includes a UE ID, and the UE ID is used to indicate a target UE of the granted resource.

In an example, the control information is CSI, the indication information is first bit information newly added in the SCI, and the UE ID is second bit information newly added in the SCI.

The solutions of the embodiments of the disclosure are introduced mainly from the angle of interaction between each network element. It can be understood that, for realizing the functions, the UE and the network device include corresponding hardware structures and/or software modules executing each function. Those skilled in the art may easily realize that the units and algorithm steps of each example described in combination with the embodiments disclosed in the disclosure may be implemented by hardware or a combination of the hardware and computer software in the disclosure. Whether a certain function is executed by the hardware or in a manner of driving the hardware by the computer software depends on specific applications and design constraints of the technical solutions. Professionals may realize the described functions for each specific application by use of different methods, but such realization shall fall within the scope of the disclosure.

According to the embodiments of the disclosure, functional units of the UE and the network device may be divided according to the abovementioned method examples. For example, each functional unit may be divided correspondingly to each function, and two or more than two functions may also be integrated into a processing unit. The integrated unit may be implemented in a hardware form, or may be implemented in form of software program module. It is to be noted that division of the units in the embodiment of the disclosure is schematic and only logical function division, and another division manner may be adopted during practical implementation.

Figure 9:
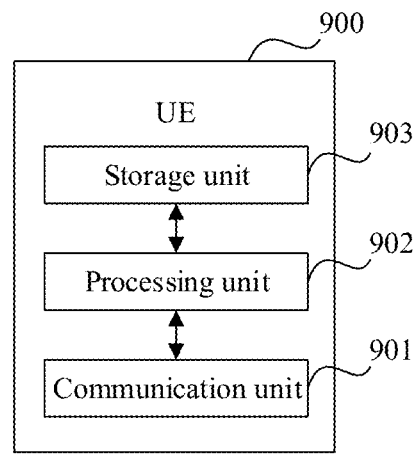
FIG. 9 illustrates a block diagram of another UE according to an embodiment of the present disclosure.

Under the condition that an integrated unit or module is adopted, FIG. 9 is a possible functional unit block diagram of UE involved in the abovementioned embodiments. The UE 900 includes a processing unit 901, a communication unit 902 and a storage unit 903. The processing unit 901 is configured to control and manage operations of the UE, the communication unit 902 is configured to support communication between the UE and another device, and the storage unit 903 is configured to store a program code and data of the UE. It is to be noted that the processing unit 901, the communication unit 902 and the storage unit 903 are configured to support execution of the steps in the methods and descriptions are omitted.

The processing unit 901 may be a processor or a controller, which may be, for example, a Central Processing Unit (CPU), a universal processor, a Digital Signal Processor (DSP), an Application-Specific Integrated Circuit (ASIC), a Field Programmable Gate Array (FPGA) or another programmable logical device, a transistor logical device, hardware component or any combination thereof. It may implement or execute various exemplary logical blocks, modules and circuits described in combination with the contents disclosed in the disclosure. The processor may also be a combination realizing a calculation function, for example, including a combination of one or more microprocessors and a combination of a DSP and a microprocessor. The communication unit 902 may be a transceiver, a transceiver circuit, a Radio Frequency (RF) chip and the like. The storage unit 903 may be a memory.

When the processing unit 901 is a processor, the communication unit 902 is a communication interface and the storage unit 903 is a memory, the UE involved in the embodiment of the disclosure may be the UE illustrated in FIG. 7.

Figure 10:
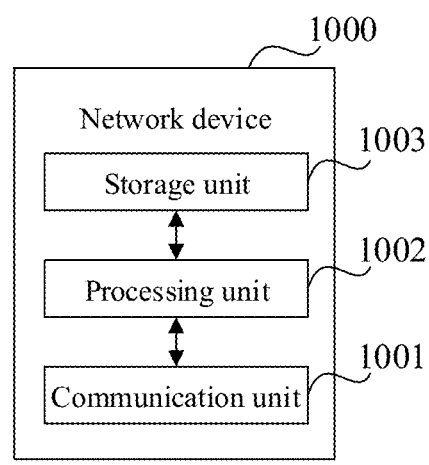
FIG. 10 illustrates a block diagram of another network device according to an embodiment of the present disclosure.

Under the condition that an integrated unit or module is adopted, FIG. 10 is a possible functional unit block diagram of a network device involved in the abovementioned embodiments. The network device 1000 includes a processing unit 1001, a communication unit 1002 and a storage unit 1003. The processing unit 1001 is configured to control and manage operations of the network device, the communication unit 1002 is configured to support communication between the network device and another device, and the storage unit 1003 is configured to store a program code and data of the network device. It is to be noted that the processing unit 1001, the communication unit 1002 and the storage unit 1003 are configured to support execution of the steps in the methods and descriptions are omitted.

The processing unit 1001 may be a processor or a controller, which may be, for example, a CPU, a universal processor, a DSP, an ASIC, an FPGA or another programmable logical device, transistor logical device, hardware component or any combination thereof. It may implement or execute various exemplary logical blocks, modules and circuits described in combination with the contents disclosed in the disclosure. The processor may also be a combination realizing a calculation function, for example, including a combination of one or more microprocessors and a combination of a DSP and a microprocessor. The communication unit 1002 may be a transceiver, a transceiver circuit, an RF chip and the like. The storage unit 1003 may be a memory.

When the processing unit 1001 is a processor, the communication unit 1002 is a communication interface and the storage unit 1003 is a memory, the network device involved in the embodiment of the disclosure may be the network device illustrated in FIG. 8.

Figure 11:
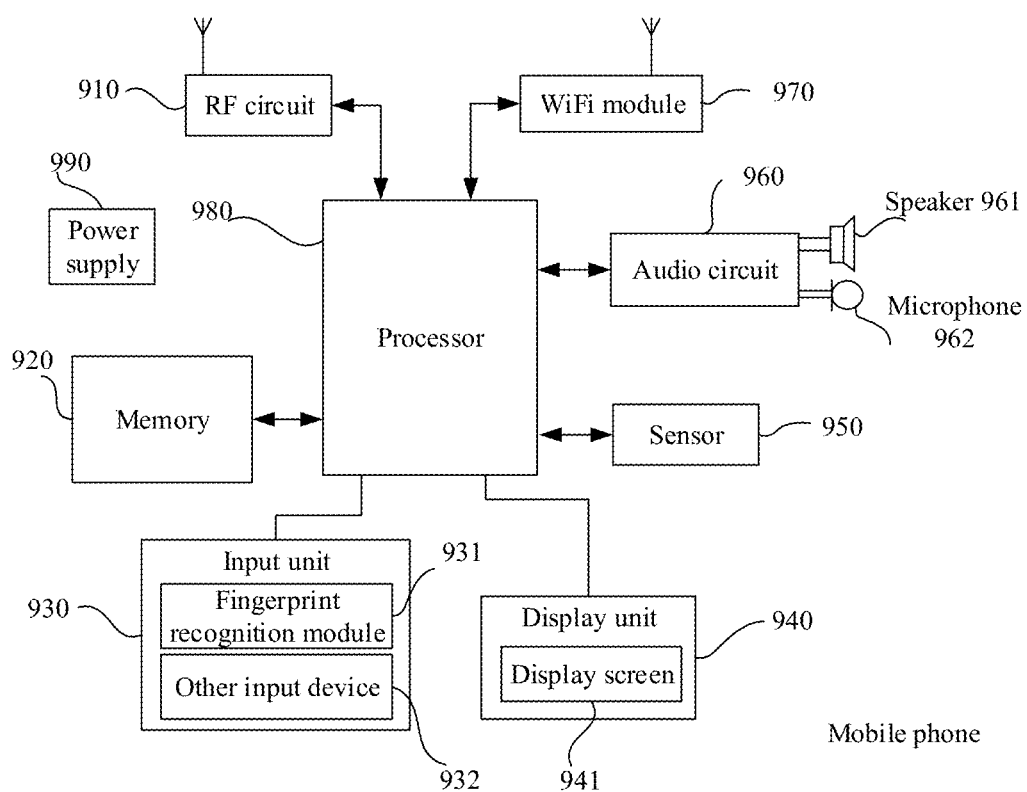
FIG. 11 illustrates a block diagram of another UE according to an embodiment of the present disclosure.

An embodiment of the disclosure also provides another UE. As illustrated in FIG. 11, for convenience of description, only parts related to the embodiment of the present disclosure are illustrated, and specific technical details which are undisclosed may be seen from parts of the method of the embodiments of the disclosure. The UE may be any UE including a mobile phone, a tablet computer, a Personal Digital Assistant (PDA), a Point of Sales (POS), a vehicular computer and the like. For example, the UE is a mobile phone.

FIG. 11 is a block diagram of part of a structure of a mobile phone related to the UE according to an embodiment of the disclosure. As illustrated FIG. 11, the mobile phone includes components such as an RF circuit 910, a memory 920, an input unit 930, a display unit 940, a sensor 950, an audio circuit 960, a WiFi module 970, a processor 980 and a power supply 990. Those skilled in the art should know that the structure of the mobile phone illustrated in FIG. 11 is not intended to limit the mobile phone and may include components more or fewer than those illustrated in the figure or some components are combined or different component arrangements are adopted.

Each component of the mobile phone will be specifically introduced below in combination with FIG. 11.

The RF circuit 910 may be configured to receive and send information. The RF circuit 910 usually includes, but not limited to, an antenna, at least one amplifier, a transceiver, a coupler, a Low Noise Amplifier (LNA), a duplexer and the like. In addition, the RF circuit 910 may also communicate with a network and another device through wireless communication. Any communication standard or protocol may be adopted for wireless communication, including, but not limited to, a Global System of Mobile communication (GSM), a General Packet Radio Service (GPRS), Code Division Multiple Access (CDMA), Wideband Code Division Multiple Access (WCDMA), LTE, an electronic mail, Short Messaging Service (SMS) and the like.

The memory 920 may be configured to store a software program and a module. The processor 980 operates the software program and module stored in the memory 920, thereby executing various function applications and data processing of the mobile phone. The memory 920 may mainly include a program storage region and a data storage region. The program storage region may store an operating system, an application program required by at least one function and the like. The data storage region may store data created according to use of the mobile phone and the like. In addition, the memory 920 may include a high-speed Random Access Memory (RAM) and may further include a nonvolatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include a fingerprint recognition module 931 and another input device 932. The fingerprint recognition module 931 may acquire fingerprint data of a user thereon. Besides the fingerprint recognition module 931, the input unit 930 may further include the other input device 932. Specifically, the other input device 932 may include, but not limited to, one or more of a touch screen, a physical keyboard, a function key (for example, a volume control button and a switch button), a trackball, a mouse, a stick and the like.

The display unit 940 may be configured to display information input by the user or information provided for the user and various menus of the mobile phone. The display unit 940 may include a display screen 941. Optionally, the display screen 941 may be configured in form of Liquid Crystal Display (LCD) and Organic Light-Emitting Diode (OLED). In FIG. 11, the fingerprint recognition module 931 and the display screen 941 realize input and output functions of the mobile phone as two independent components. However, in some embodiments, the fingerprint recognition module 931 and the display screen 941 may be integrated to realize the input and play functions of the mobile phone.

The mobile phone may further include at least one sensor 950, for example, a light sensor, a motion sensor and another sensor. Specifically, the light sensor may include an ambient light sensor and a proximity sensor. The ambient light sensor may regulate brightness of the display screen 941 according to brightness of ambient light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

The audio circuit 960 includes a speaker 961, and a microphone 962 may provide an audio interface between the user and the mobile phone. The audio circuit 960 may transmit an electric signal obtained by converting received audio data to the speaker 961, and the speaker 961 converts it into a sound signal for playing. On the other hand, the microphone 962 converts a collected sound signal into an electric signal, the audio circuit 960 receives and converts it into audio data, and the audio data is processed by the playing processor 980 and sent to, for example, another mobile phone through the RF circuit 910, or the audio data is stored into the memory 920 for further processing.

WiFi is a short-distance wireless transmission technology. The mobile phone may help the user through the WiFi module 970 to receive and send an electronic mail, browse a webpage, access streaming media and the like, and wireless wideband Internet access is provided for the user. Although the WiFi module 970 is illustrated in FIG. 11, it can be understood that it is not a necessary composition of the mobile phone and may completely be omitted according to a requirement without changing the scope of the essence of the disclosure.

The processor 980 is a control center of the mobile phone, connects each part of the whole mobile phone by use of various interfaces and lines and executes various functions and data processing of the mobile phone by running or executing the software program and/or module stored in the memory 920 and calling data stored in the memory 920, thereby monitoring the whole mobile phone. Optionally, the processor 980 may include one or more processing units. Preferably, the processor 980 may integrate an application processor and a modulation and demodulation processor. The present disclosure processor mainly processes the operating system, a user interface, an application program and the like. The modulation and demodulation processor mainly processes wireless communication. It can be understood that the modulation and demodulation processor may also not be integrated into the processor 980.

The mobile phone further includes the power supply 990 for supplying power to each part. Preferably, the power supply may be logically connected with the processor 980 through a power management system, thereby realizing functions of charging and discharging management, power consumption management and the like through the power management system.

Although not illustrated in the figure, the mobile phone may further include a camera, a Bluetooth module and the like, which will not be elaborated herein.

In the embodiments illustrated in FIG. 3, FIG. 5 and FIG. 6, the flows on a UE side in each step of the method may be implemented based on the structure of the mobile phone.

In the embodiment illustrated in FIG. 9, each functional unit may be implemented based on the structure of the mobile phone.

An embodiment of the disclosure also provides a computer-readable storage medium, which stores a computer program for electronic data exchange, the computer program enabling a computer to execute part or all of the steps executed by the UE in, for example, the abovementioned method embodiments.

An embodiment of the disclosure also provides a computer-readable storage medium, which stores a computer program for electronic data exchange, the computer program enabling a computer to execute part or all of the steps executed by the network device in, for example, the abovementioned method embodiments.

An embodiment of the disclosure further provides a computer program product. The computer program product includes a non-transitory computer-readable storage medium storing a computer program. The computer program may be operated to enable a computer to execute part or all of the steps executed by the UE in, for example, the abovementioned methods. The computer program product may be a software installation package.

An embodiment of the disclosure further provides a computer program product. The computer program product includes a non-transitory computer-readable storage medium storing a computer program. The computer program may be operated to enable a computer to execute part or all of the steps executed by the network device in, for example, the abovementioned method embodiments. The computer program product may be a software installation package.

The steps of the method or algorithm described in the embodiments of the disclosure may be implemented in a hardware manner, and may also be implemented in a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or part of the functions described in the embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementation modes further describe the purposes, technical solutions and beneficial effects of the embodiments of the disclosure in detail. It is to be understood that the above is only the specific implementation mode of the embodiments of the disclosure and not intended to limit the scope of protection of the embodiments of the disclosure. Any modifications, equivalent replacements, improvements and the like made based on the technical solutions of the embodiments of the disclosure shall fall within the scope of protection of the embodiments of the disclosure.

What is claimed is:

1. A data scheduling method, comprising:
   receiving, by a user equipment (UE), control information from a network device;
   receiving, by the UE, signaling from the network device, the signaling containing a mapping relationship between carriers and versions of duplicated data;
   determining, by the UE, a version of duplicated data to be transmitted on a granted resource according to the control information;
   determining, by the UE, a version of the duplicated data to be transmitted on a granted resource according to the mapping relationship between carriers and versions of the duplicated data; and
   transmitting, by the UE, data corresponding to the version on the granted resource.

2. The method of claim 1, wherein the control information comprises indication information, the indication information indicates the version of the duplicated data to be transmitted on the granted resource, and wherein determining, by the UE, the version of the duplicated data to be transmitted on the granted resource according to the control information comprises:
   determining, by the UE, the version of the duplicated data to be transmitted on the granted resource according to the indication information.

3. The method of claim 2, wherein the control information is sidelink control information (SCI), the indication information is first bit information newly added in the SCI, and the UE ID is second bit information newly added in the SCI.

4. The method of claim 1, wherein the signaling comprises radio resource control (RRC) signaling or system information.

5. The method of claim 1, wherein the control information comprises a UE Identity (ID), the UE ID indicates a target UE of the granted resource, and wherein transmitting, by the UE, the data corresponding to the version on the granted resource comprises:
   transmitting, by the UE, the data, corresponding to the version, for the UE ID, on the granted resource.

6. A user equipment (UE), comprising one or more processors, one or more memories, one or more transceivers, and one or more programs, wherein the one or more programs are stored in the memory and configured to be executed by the one or more processors and the programs comprising instructions for executing actions comprising:
   receiving control information from a network device;
   receiving signaling from the network device, the signaling containing a mapping relationship between carriers and versions of the duplicated data;
   determining a version of duplicated data to be transmitted on a granted resource according to the control information;
   determining a version of the duplicated data to be transmitted on a granted resource according to the mapping relationship between carriers and versions of the duplicated data; and
   transmitting data corresponding to the version on the granted resource.

7. The UE of claim 6, wherein the control information comprises indication information, the indication information indicates the version of the duplicated data to be transmitted on the granted resource, and wherein determining the version of the duplicated data to be transmitted on the granted resource according to the control information comprises:
   determining the version of the duplicated data to be transmitted on the granted resource according to the indication information.

8. The UE of claim 7, wherein the control information is sidelink control information (SCI), the indication information is first bit information newly added in the SCI, and the UE ID is second bit information newly added in the SCI.

9. The UE of claim 6, wherein the signaling comprises radio resource control (RRC) signaling or system information.

10. The UE of claim 6, wherein the control information comprises a UE Identity (ID), the UE ID indicates a target UE of the granted resource, and wherein transmitting the data corresponding to the version on the granted resource comprises:
    transmitting the data, corresponding to the version, for the UE ID, on the granted resource.

11. A network device, comprising one or more processors, one or more memories, one or more transceivers, and one or more programs, wherein the one or more programs are stored in the memory and configured to be executed by the one or more processors and the programs comprising instructions for executing actions comprising:
    configuring control information, wherein the control information is used to determine a version of duplicated data to be transmitted on a granted resource;
    sending the control information; and
    sending signaling, the signaling containing a mapping relationship between carriers and versions of the duplicated data, wherein the mapping relationship between carriers and versions of the duplicated data is used to determine the version of the duplicated data to be transmitted on the granted resource.

12. The network device of claim 11, wherein the control information comprises indication information, and the indication information indicates the version of the duplicated data to be transmitted on the granted resource.

13. The network device of claim 11, wherein the signaling comprises Radio Resource Control (RRC) signaling or system information.

14. The network device of claim 11, wherein the control information comprises a user equipment (UE) Identity (ID), and the UE ID indicates a target UE of the granted resource.

15. The network device of claim 11, wherein the control information is sidelink control information (SCI), the indication information is first bit information newly added in the SCI, and the UE ID is second bit information newly added in the SCI.

* * * * *